(12) United States Patent
Weizman et al.

(10) Patent No.: US 12,399,976 B2
(45) Date of Patent: Aug. 26, 2025

(54) AGENTLESS EXTRACTION OF CLOUD CREDENTIALS

(71) Applicant: Microsoft Technology Licensing, LLC, Redmond, WA (US)

(72) Inventors: Josef Weizman, Haifa (IL); Ram Haim Pliskin, Rishon Lezion (IL); Lior Sonntag, Givatayim (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 397 days.

(21) Appl. No.: 17/715,749

(22) Filed: Apr. 7, 2022

(65) Prior Publication Data
US 2023/0325489 A1  Oct. 12, 2023

(51) Int. Cl.
*G06F 21/45* (2013.01)
*H04L 9/40* (2022.01)

(52) U.S. Cl.
CPC ............. *G06F 21/45* (2013.01); *H04L 63/20* (2013.01)

(58) Field of Classification Search
CPC ................................ G06F 21/45; H04L 63/20
See application file for complete search history.

(56) References Cited

U.S. PATENT DOCUMENTS

| | | | | |
|---|---|---|---|---|
| 11,785,051 B1 * | 10/2023 | Rossman | ............ | H04L 63/1433 726/1 |
| 2020/0082071 A1 | 3/2020 | Cherny et al. | | |
| 2020/0128028 A1 * | 4/2020 | Hittel | ............. | G06F 21/552 |
| 2020/0137096 A1 * | 4/2020 | Endler | ............. | H04L 63/083 |
| 2021/0397697 A1 * | 12/2021 | Kulaga | ............. | G06F 21/6245 |
| 2022/0345483 A1 * | 10/2022 | Shua | ............. | H04L 9/0825 |
| 2022/0405274 A1 * | 12/2022 | Shang | ............. | G06F 16/2455 |
| 2023/0325490 A1 | 10/2023 | Weizman et al. | | |

OTHER PUBLICATIONS

Meli, et al., "How Bad Can It Git? Characterizing Secret Leakage in Public GitHub Repositories", in Proceedings of Network and Distributed System Security Symposium, Jan. 1, 2019, 15 Pages.
"International Search Report and Written Opinion issued in PCT Application No. PCT/US2023/014665", Mailed Date: May 31, 2023, 11 Pages.
"International Search Report and Written Opinion issued in PCT Application No. PCT/US2023/015050", Mailed Date: Jun. 2, 2023, 12 Pages.

(Continued)

*Primary Examiner* — Noura Zoubair
(74) *Attorney, Agent, or Firm* — Workman Nydegger

(57) ABSTRACT

A computing system is configured to access a cloud storage and make a copy of at least a portion of the cloud storage. The copy of the at least portion of the cloud storage to search for a data pattern associated with a credential. In response to finding the data pattern associated with the credential, the computing system extracts an identifier associated with the credential and a scope of permission that the identifier is granted to. The scope of permission is associated with a permission to access a cloud resource. Finally, a risk of potential exposure of the credential is mitigated, such as (but not limited to) notifying an owner of the cloud resource, deleting the credential from the cloud, or modifying or revoking the scope of permission associated with the credential.

20 Claims, 10 Drawing Sheets

(56) References Cited

OTHER PUBLICATIONS

Sinha, et al., "Detecting and Mitigating Secret-Key Leaks in Source Code Repositories", in Proceedings of IEEE/ACM 12th Working Conference on Mining Software Repositories, May 16, 2015, pp. 396-400.

U.S. Appl. No. 17/715,755, filed Apr. 7, 2023.

Non-Final Office Action mailed on Jul. 1, 2024, in U.S. Appl. No. 17/715,755, 21 pages.

Final Office Action mailed on Nov. 14, 2024, in U.S. Appl. No. 17/715,755, 21 pages.

U.S. Appl. No. 17/715,755, filed Apr. 7, 2022.

Non-Final Office Action mailed on Apr. 24, 2025, in U.S. Appl. No. 17/715,755, 26 pages.

* cited by examiner

AGENTLESS EXTRACTION OF CLOUD CREDENTIALS

BACKGROUND

A cloud generally refers to an information technology (IT) environment that is designed for the purpose of remotely provisioning scalable and measured IT resources (hereinafter also referred to as resources). A resource may be a physical or virtual artifact that can be either software-based or hardware-based. Software-based resources include (but are not limited to) a virtual server or a custom software program. Hardware-based resources include (but are not limited to) a physical server or a network device.

A cloud service is a resource that is made remotely accessible via a cloud. As a remotely accessible environment, a cloud service represents an option for the deployment of resources. A cloud service provider is a party that provides cloud services. A cloud service consumer is a runtime role assumed by a software program, a hardware device, or a combination thereof, when it accesses a cloud service. Common types of cloud service consumers include (but are not limited to) software programs and services capable of remotely accessing cloud services, and/or workstations, laptops, and/or mobile devices running software capable of remotely accessing resources positioned as cloud services.

Recently, more and more organizations have moved their IT resources to clouds. It is crucial to secure access to those resources. There are multiple methods to authenticate users for accessing cloud resources. Many of these methods involve storing credentials on a resource, risking exposure of the credentials to malicious actors. For example, a cloud provider may allow users to manage their resources using a command-line interface (CLI). After the user enters their credentials over the CLI, the credentials may be stored on a resource, potentially allowing anyone with access to the resource to read the credentials.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a computing system configured to access a cloud storage and make a copy of at least a portion of the cloud storage. The copy of the at least portion of the cloud storage is then scanned to search for a data pattern associated with a credential. In response to finding the data pattern associated with the credential, the computing system then extracts an identifier associated with the credential and identifies a scope of permission, to which the identifier is granted. The scope of permission is associated with a permission to access a cloud resource. Finally, the computing system is configured to mitigate a risk of potential exposure of the credential, which includes (but is not limited to) at least one of (1) generating a security alert, notifying an owner of the cloud resource, (2) deleting the credential from the cloud storage, (3) modifying or revoking the scope of permission associated with the credential, and/or (4) resetting a password associated with the credential.

In some embodiments, making a copy of the at least portion of the cloud service includes identifying a size of a first disk of the cloud storage, provisioning a second disk based on the size of the first disk, and copying data in the first disk into the second disk.

In some embodiments, identifying the scope of permission includes obtaining a permission to access a user database that stores identifiers and scopes of permission relationally, querying the user database to obtain the scope of permission and the resource associated therewith based on the identifier, and querying the user database to obtain an owner of the resource.

In some embodiments, the data pattern is one of a plurality of predetermined data patterns. In some embodiments, the plurality of predetermined data patterns include (but are not limited to) at least one of (1) a cloud service password of a principal, (2) a cloud service certificate of a principal, (3) a cloud service command line (CLI) token, (4) a cloud service CLI credential, (5) a cloud application service publish setting file, (6) a Kubernetes kubeconfig file, (7) a cloud storage connection string, (8) a container registry credential, (9) a relational database service (RDS) secret, and/or (10) an OpenShift configuration file.

In some embodiments, in response to finding a cloud service password of a principal, the computing system is configured to identify a resource that the principal has access to or a project that the principal has access to. In some embodiments, in response to finding a Kubernetes kubeconfig file, the computing system is configured to identify a workload or a secret in a Kubernetes cluster. In some embodiments, in response to finding a cloud storage connection string, the computing system is configured to identify a container, a blob, or a bucket that a credential associated with the cloud storage connection string has access to. In some embodiments, in response to finding a container registry, the computing system is configured to identify a repository in the container registry and a scope of permission that a credential associated with the container registry has.

The embodiments described herein are also related to a method for agentless finding credentials from a cloud storage. The method includes making a copy of at least a portion of the cloud storage and scanning the copy of the at least portion of cloud storage to search for a data pattern associated with a credential. In response to finding a data pattern associated with the credential, an identifier associated with the credential is extracted from the data pattern. Based on the identifier, a scope of permission, to which the identifier is granted, is then identified. The scope of permission is associated with a permission to access a cloud resource. The method also includes mitigating a risk of potential exposure of the credential. Mitigating the risk of potential exposure of the credential includes (but is not limited to) at least one of (1) generating a security alert, notifying an owner of the cloud resource, (2) deleting the credential from the cloud storage, (3) modifying or revoking the scope of permission associated with the credential, and/or (4) resetting a password associated with the credential.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Figure 1A:
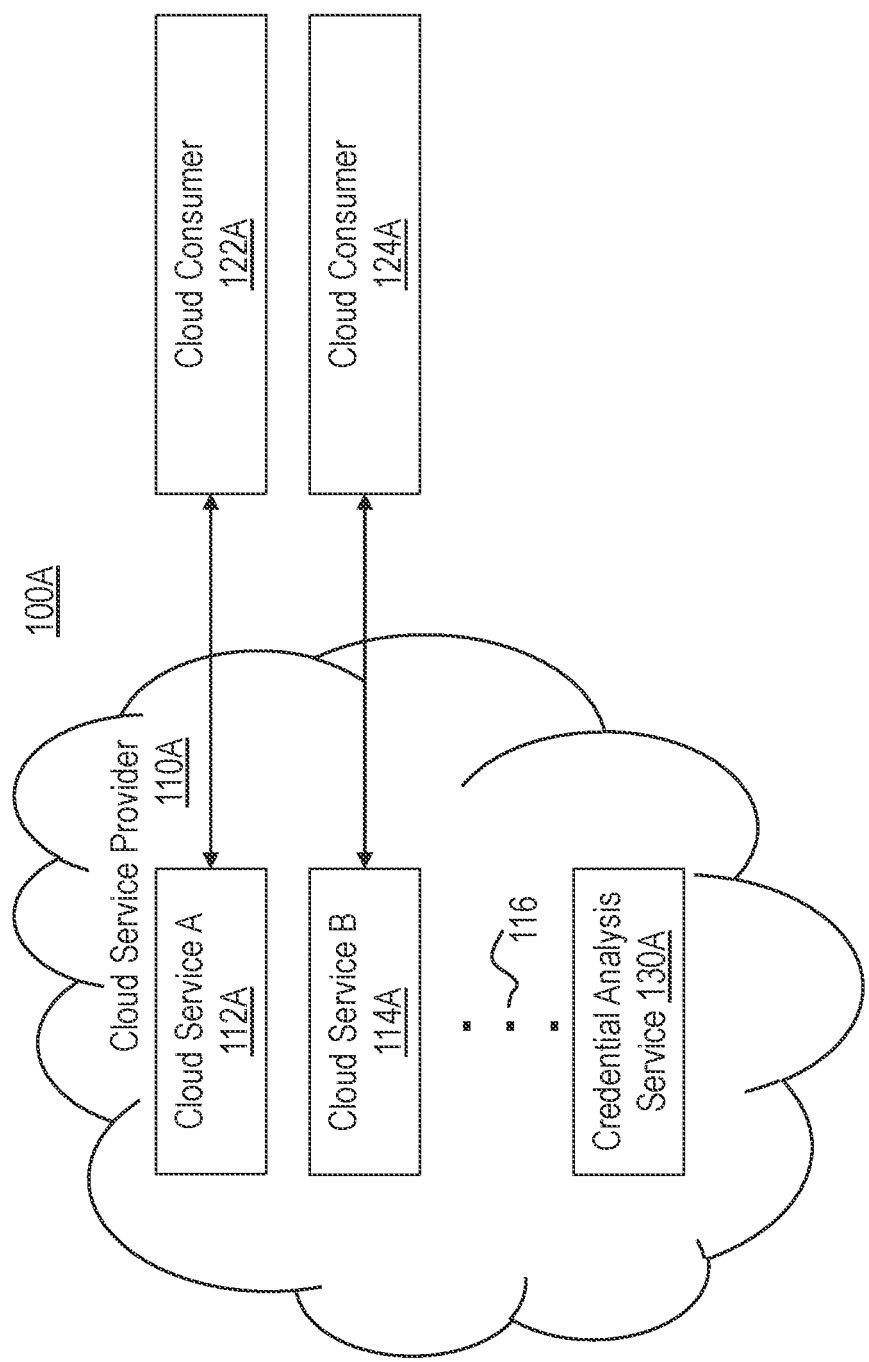
FIG. 1A illustrates an example system in which a credential analysis service is implemented at a cloud service provider configured to scan cloud storages hosted by the cloud service provider.

As more and more organizations move their IT assets to the cloud, it is crucial to secure access to those resources. There are multiple ways to authenticate with cloud resources. Many of them involve credentials that are stored on a computing resource, such as (but not limited to) plaintext credentials or client certification. For example, some cloud providers allow users to manage their resources using a CLI (Command Line Interface). Often, anyone with access to those cloud storages could read the credentials and laterally move to the cloud resources and possibly achieve privilege escalation.

The principles described herein provide a novel method to discover cloud credentials stored on cloud resources. The method offers a completely agentless solution that relies on management access to the cloud resources that store the credentials. The method includes copying the cloud-based storage that hosts the protected resource's filesystem to a new cloud resource that is controlled by the security solution. As such, it ensures that the protected resource is not modified by the operation of the data. After mounting the protected resource's file system to the newly created cloud resource, one or more scans can then be performed on the filesystem. If a credential is found, a security alert or a security recommendation is sent to the protected resource owner.

The cloud-related credentials can generally be categorized into two categories: (1) credentials for cloud environments, and (2) credentials that are used by applications that are likely to run in cloud environments. The first group can include (but is not limited to) cloud service principal passwords, cloud service principal certificates, CLI tokens, and application service publish settings files. The second group can include (but is not limited to) Kubernetes Kubeconfig files, cloud storage connection strings, container registry credentials, RDS database secrets, and OpenShift configuration file. Each credential type has its own format and/or pattern, and is usually stored in a specific location on a disk. For example, some credentials are in JSON (JavaScript Object Notation) format, some credentials are in YAML (Yet Another Markup Language) file format, some credentials are in XML (extensible markup language) file format, some credentials are text strings, etc.

In some embodiments, the different patterns and/or formats of the different types of credentials are collected and stored in a credential database, and the copy of the disk is scanned to find those specific patterns and/or formats and extract the relevant credentials accordingly.

In some embodiments, first-party access to the cloud resources (that are to be scanned) is available. For example, when a credential analysis service is implemented at a cloud service provider that hosts the cloud resources, the credential analysis service has first-party access to the cloud resources that are hosted by itself. Alternatively, or in addition, permissions to access cloud resources (that are to be scanned) are given to the credential analysis service. For example, the credential analysis service may be given read-only permission to read and make a copy of the data stored in a cloud storage. In response to finding a credential, a mitigating action can then be performed.

Depending on the found credential, a different mitigation action may be performed, and/or a different report or security alert may be generated. For example, in some embodiments, when a cloud service password of a principal is found, the resources that the principal has permission to are reported; when a Kubernetes kubeconfig file is found, workloads and secrets in a Kubernetes cluster is reported; when a cloud storage connection string is found, the containers, blobs, and/or buckets that the credential has access to is reported; and when a container registry credential is found, repositories in the registry and permissions that the credential has is reported.

In some cases, the cloud resource associated with the credential is also a cloud storage (also referred to as a second cloud storage), and this second cloud storage is also scanned, and additional credentials are found from the second cloud storage. The additional credentials are associated with additional cloud resources, which may also be cloud storages (also referred to as third cloud storages). This process can continue until a closed set of cloud storages are identified. This closed set of storages are also referred to as a blast radius of the first credential extracted from the first cloud storage.

In some embodiments, a plurality of cloud resources are scanned, and a plurality of credentials are extracted from the plurality of cloud resources. A network of relationships between the credentials and the plurality of cloud resources can then be obtained. For any given credential, a blast radius can be identified based on the obtained network of relationships.

In some embodiments, the blast radius and/or the network of relationships can be visualized and presented to owners of each or some of the owners of the cloud storages therewithin. The blast radius can also be used to measure the risk of potential exposure of the first credential. The greater the blast radius, the greater risk of potential exposure of the first credential might be, and more mitigating actions may be performed.

FIG. 1A illustrates an example system 100A in which the principles described herein may be implemented. The system 100A includes a cloud service provider 110A configured to host a plurality of cloud services, including cloud service A 112A and cloud service B 114A. Cloud service A 112A is accessible by a cloud consumer 122A, and cloud service B 114A is accessible by a cloud consumer 124A. Ellipsis 116 represents that there may be any number of cloud services hosted by the cloud service provider 110A.

A cloud service (e.g., cloud service A 112A or cloud service B 114A) is a resource that is made remotely accessible via a cloud. As a remotely accessible environment, a cloud service represents an option for the deployment of resources. The resources described herein may be physical resources or virtual resources. Virtualization is a process of converting a physical resource into a virtual resource. For example, a physical storage device can be abstracted into a virtual storage device or a virtual disk.

A cloud service provider (e.g., cloud service provider 110A) is a party that provides cloud services. A cloud service consumer (e.g., cloud consumer 122A or cloud consumer 124A) is a runtime role assumed by a software program, a hardware device, and/or a combination thereof when it accesses a cloud service. Common types of cloud service consumers include (but are not limited to) software programs and services capable of remotely accessing cloud services, and/or workstations, laptops, and mobile devices running software capable of remotely accessing resources positioned as cloud services.

As illustrated in FIG. 1A, a credential analysis service 130A is also provided by the cloud service provider. The credential analysis service 130A is a service configured to access and scan cloud resources associated with the cloud service A 112A and cloud service B 114A to find credentials. Since the credential analysis service 130A is provided by the cloud service provider, it has first-party access to the cloud resources associated with the cloud service A 112A and the cloud service B 114A.

Once a credential is found, the credential analysis service 130A also has first-party access to a user database. The user database stores identifiers and their corresponding scopes of permissions relationally. The credential analysis service 130A can query the user database to obtain the scope of permission associated with the user. The scope of permission includes a permission to access a particular resource, which may or may not be associated with the cloud service where the credential is found. For example, during a scan of a storage associated with cloud service A 112A, a credential is found. The credential may be associated with a permission to access a cloud storage associated with cloud service B 114A.

In response to finding the scope of permission associated with the credential, the credential analysis service 130A then mitigates a risk of potential exposure of the credential, which includes (but is not limited to) at least one of (1) generating a security alert, notifying an owner of the cloud resource, (2) deleting the credential from the cloud storage, (3) modifying or revoking the scope of permission associated with the credential, and/or (4) changing a password associated with the credential. For example, in some embodiments, when the credential is associated with a permission to access a cloud storage associated with cloud service B 114A, the credential analysis service 130A is configured to generate a security alert to notify a security administrator of the cloud service B 114A.

Figure 1B:
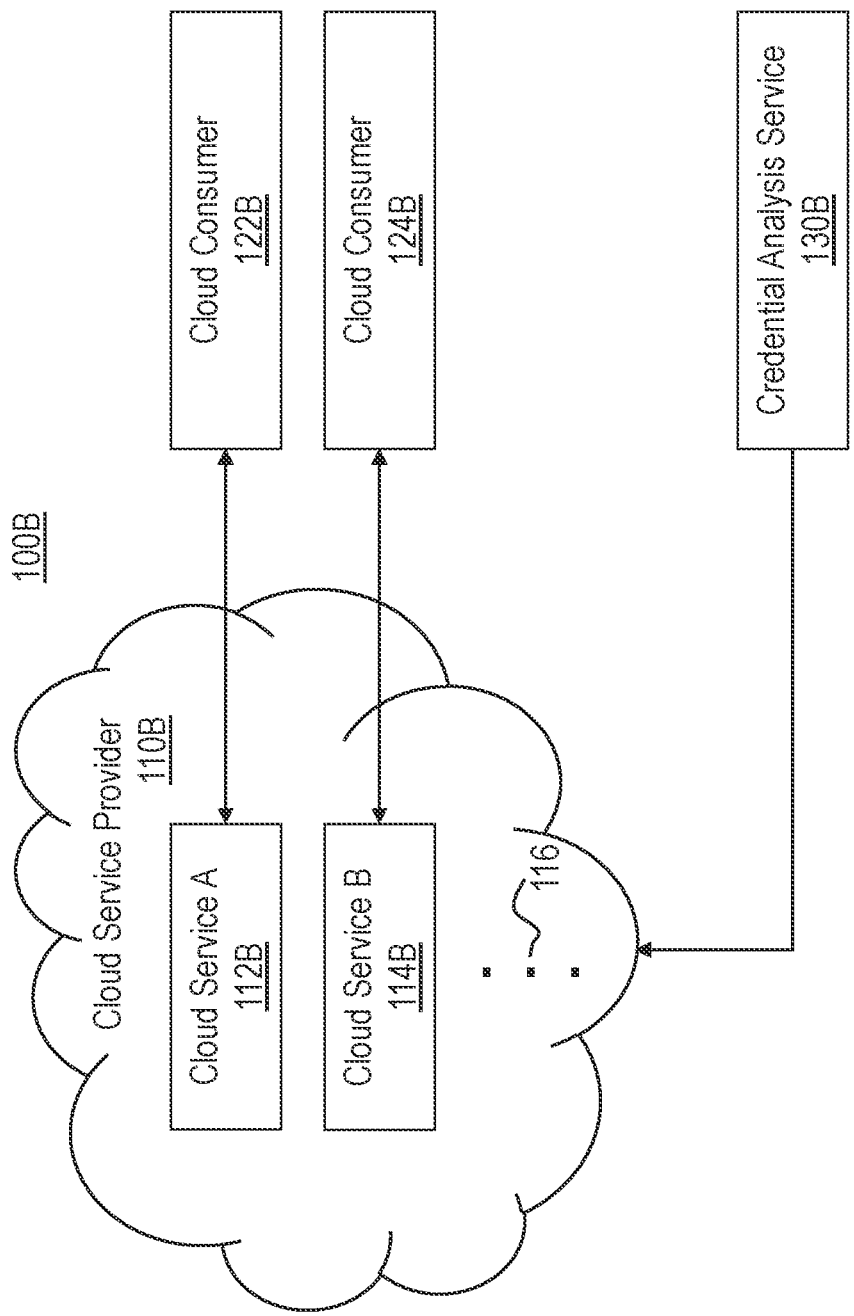
FIG. 1B illustrates another example system in which a credential analysis service is implemented as a computing system that is separate from a cloud service provider and configured to scan cloud storages hosted by the cloud service provider.

FIG. 1B illustrates another example system 100B, in which the principles described herein may be implemented. Similar to the system 100A, the system 100B also includes a cloud service provider configured to provide a cloud service A 112B and a cloud service B 114B. The cloud service A 112B is accessible by cloud consumer 122B, and the cloud service B 114B is accessible by cloud consumer 124B. However, unlike the system 100A, the system 100B includes a credential analysis service 130B that is not associated with the cloud service provider 110B. In such a case, the credential analysis service 130B does not have first-party access to the cloud resources associated with the cloud service A 112B and the cloud service B 114B, although the cloud service A 112B or cloud service B 114B (and/or the cloud service provider 110B) can grant a scope of permission to the credential analysis service 130B to access their resources. After the credential analysis service 130B obtains the scope of permission to access the resources associated with the cloud service A 112B and the cloud service B 114B, the credential analysis service 130B can then scan those cloud resources to find credentials.

Figure 1C:
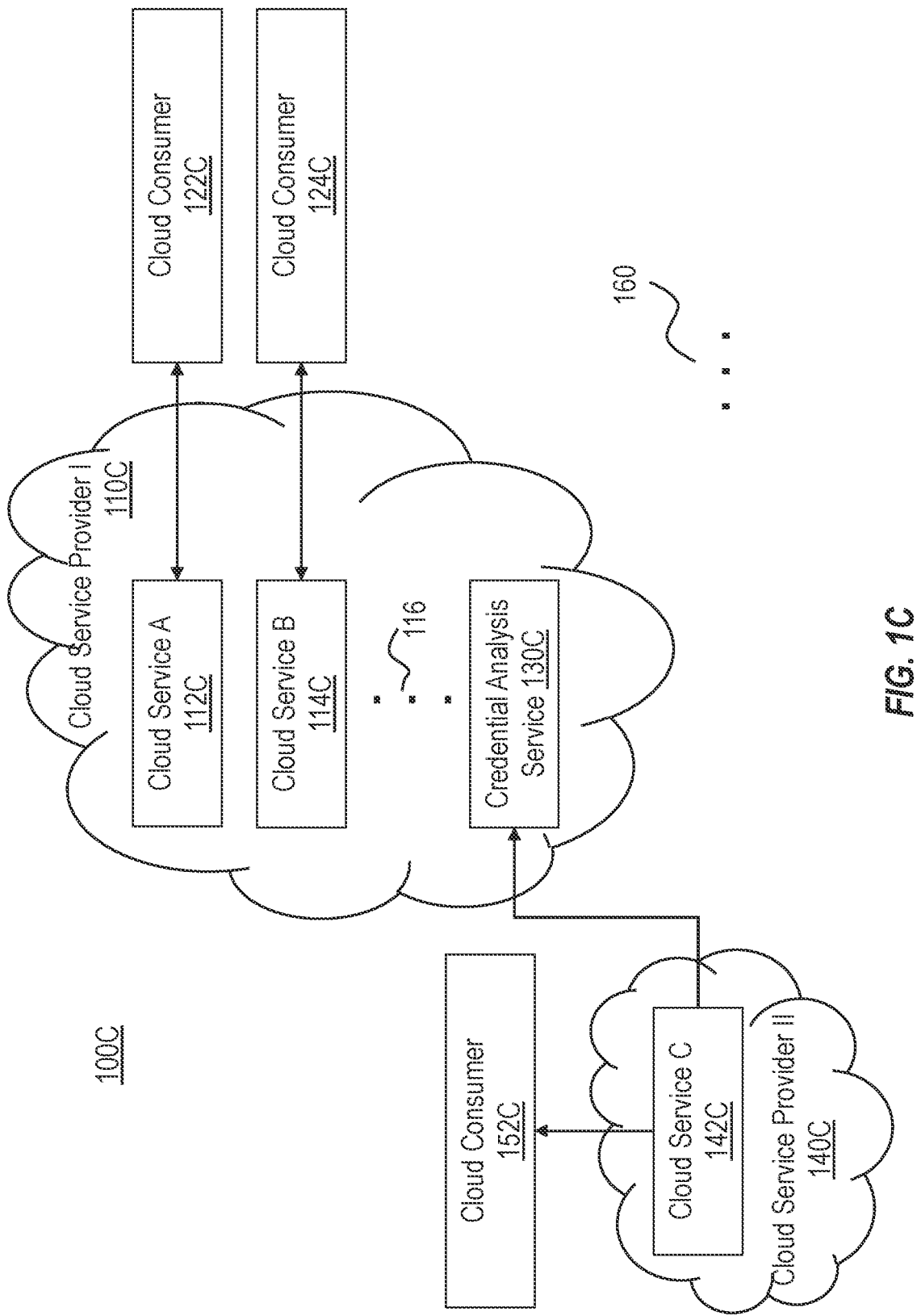
FIG. 1C illustrates another example system in which a credential analysis service described herein is implemented at a first cloud service provider configured to scan cloud storages hosted by both the first cloud service provider and a second cloud service provider.

FIG. 1C illustrates another example system 100C, in which the principles described herein may be implemented. As illustrated in FIG. 1C, the system 100C includes a plurality of cloud service providers, including cloud service provider I 110C and cloud service provider II 140C. The ellipsis 160 represents that there may be any number of cloud service providers in the system 100C. Cloud service provider I 110C hosts cloud service A 112C and cloud service B 114C, which are accessible by respective cloud consumer 122C and cloud consumer 124C. Cloud service provider II 140C hosts cloud service C 142C, which is accessible by cloud consumer 152C.

Further, a credential analysis service 130C is provided by the cloud service provider I 110C, as such, the credential analysis service 130C has first-party access to cloud resources associated with cloud service A 112C and cloud service B 114C. However, the credential analysis service 130C does not have first-party access to cloud resources associated with cloud service C 142C. As such, for the credential analysis service 130C to scan cloud resources associated with cloud service C 142C, the cloud service C 142C or the cloud service provider II 140C generally need to grant the credential analysis service 130C access to their resources.

Figure 2A:
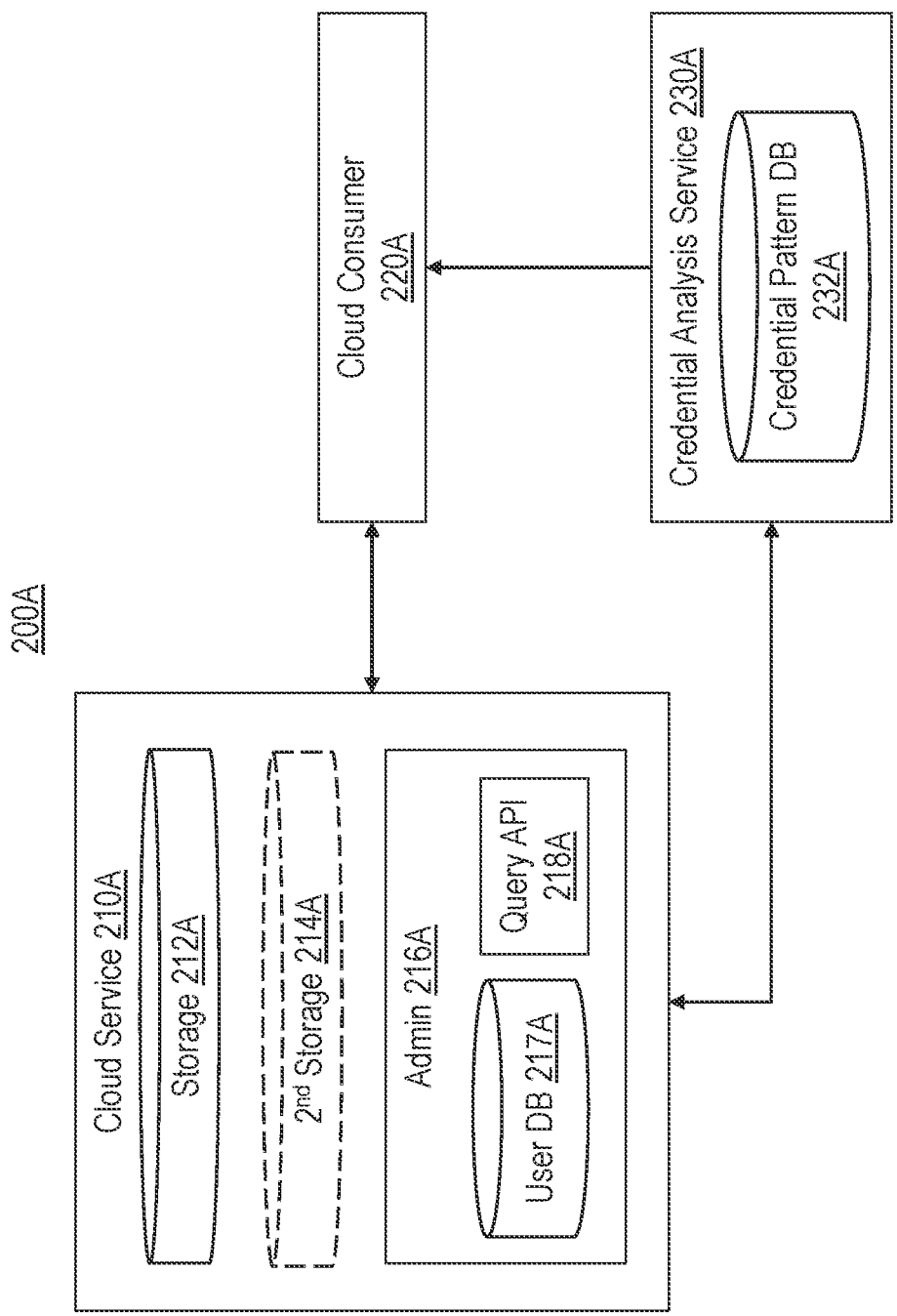
FIG. 2A illustrates an example process of finding credentials from a cloud storage.

FIG. 2A illustrates an example process 200A of finding credentials from a cloud storage. As illustrated in FIG. 2A, a cloud service 210A (which corresponds to the cloud service A 112A, cloud service B 114A in FIG. 1A, or the cloud service A 112B, cloud service B 114B in FIG. 1B) is accessible by a cloud service consumer 220A. The cloud service 210A has a variety of resources, including a storage 212A. At the same time, a credential analysis service 230A has first-party access or has been granted a scope of permission to access the storage 212A of the cloud service 210A. The credential analysis service 230A is configured to make a copy of at least a portion of the storage 212A in a second storage 214A. In some embodiments, the storage 212A includes a first disk. The credential analysis service 230A determines a size of the first disk, and causes the cloud service 210A to provision a second disk having at least the size. A copy of the first disk is then stored in the second disk. Note, as briefly discussed above, the storage 212A and 214A may be a physical storage device or a virtual storage device, and the first disk and the second disk described herein may be a physical disk or a virtual disk.

The credential analysis service 230A is then configured to scan the second storage 214A to identify a data pattern associated with a credential. In some embodiments, the data pattern is one of a plurality of predetermined data patterns corresponding to a plurality of types of credentials. In some embodiments, the plurality of predetermined data patterns include (but are not limited to) at least one of (1) a cloud service password of a principal, (2) a cloud service certificate of a principal, (3) a cloud service command line (CLI) token, (4) a cloud service CLI credential, (5) a cloud application service publish setting file, (6) a Kubernetes kubeconfig file, (7) a cloud storage connection string, (8) a container registry credential, (9) a relational database service (RDS) secret, and/or (10) an OpenShift configuration file.

Generally, each credential type has its own format and/or pattern, and is usually stored in a specific location on a disk. For example, some credentials are in JSON (JavaScript Object Notation) format, some credentials are in YAML (Yet Another Markup Language) file format, some credentials are in XML (extensible markup language) file format, some credentials are text strings, etc.

In some embodiments, the credential analysis service 230A has a credential pattern database 232A that stores the plurality of data patterns and/or formats associated with the plurality of types of credentials. The credential analysis service 230A is configured to scan the second storage 214A based on the data patterns and/or formats stored in the credential pattern database 232A.

After a credential is found, the credential analysis service 230A is then configured to extract an identifier associated with the credential and a scope of permission, to which the identifier is granted. As illustrated in FIG. 2A, in some embodiments, the cloud service 210A has an administration module 216A configured to manage a user database 217A. The user database 217A stores a plurality of identifiers and their corresponding scope of permissions. A query API 218A is provided to allow the query of user information. In some embodiments, the credential analysis service 230A has first-party access to the administration module 216A or has been granted a scope of permission to access the administration module 216A. As such, the credential analysis service 230A can query the user database 217A via the query API to obtain the scope of permission associated with the identifier. The scope of permission is associated with a permission to access a resource, which may or may not be the storage 212A that is being scanned.

In some embodiments, in response to finding a cloud service password of a principal, the credential analysis service 230A is configured to identify a resource that the principal has access to or a project that the principal has access to. In some embodiments, in response to finding a Kubernetes kubeconfig file, the credential analysis service 230A is configured to identify a workload or a secret in a Kubernetes cluster. In some embodiments, in response to finding a cloud storage connection string, the credential analysis service 230A is configured to identify a container, a blob, or a bucket that a credential associated with the cloud storage connection string has access to. In some embodiments, in response to finding a container registry, the credential analysis service 230A is configured to identify a repository in the container registry and a scope of permission that a credential associated with the container registry has.

In response to identifying the resource associated with the permission, the credential analysis service 230A can then identify an owner of the resource. The owner may or may not be the user associated with the identifier contained in the found credential. In response to identifying the owner of the resource, the credential analysis service 230A can then generate a security alert, notifying the owner of the resource. For example, if the owner is associated with the cloud service consumer 220A, the credential analysis service 230A can send the security alert to the cloud service consumer 220A. Alternatively, or in addition, the credential analysis service 230A may also delete the credential from the storage 212A, modify or revoke the scope of permission associated with the credential, and/or reset a password associated with the credential. In some embodiments, which mitigating action is to be performed is based on an attribute or importance of the resource and/or settings, which may be set by the owner of the credential, the owner of the resource, the cloud service 210A, and/or the cloud service provider.

Figure 2B:
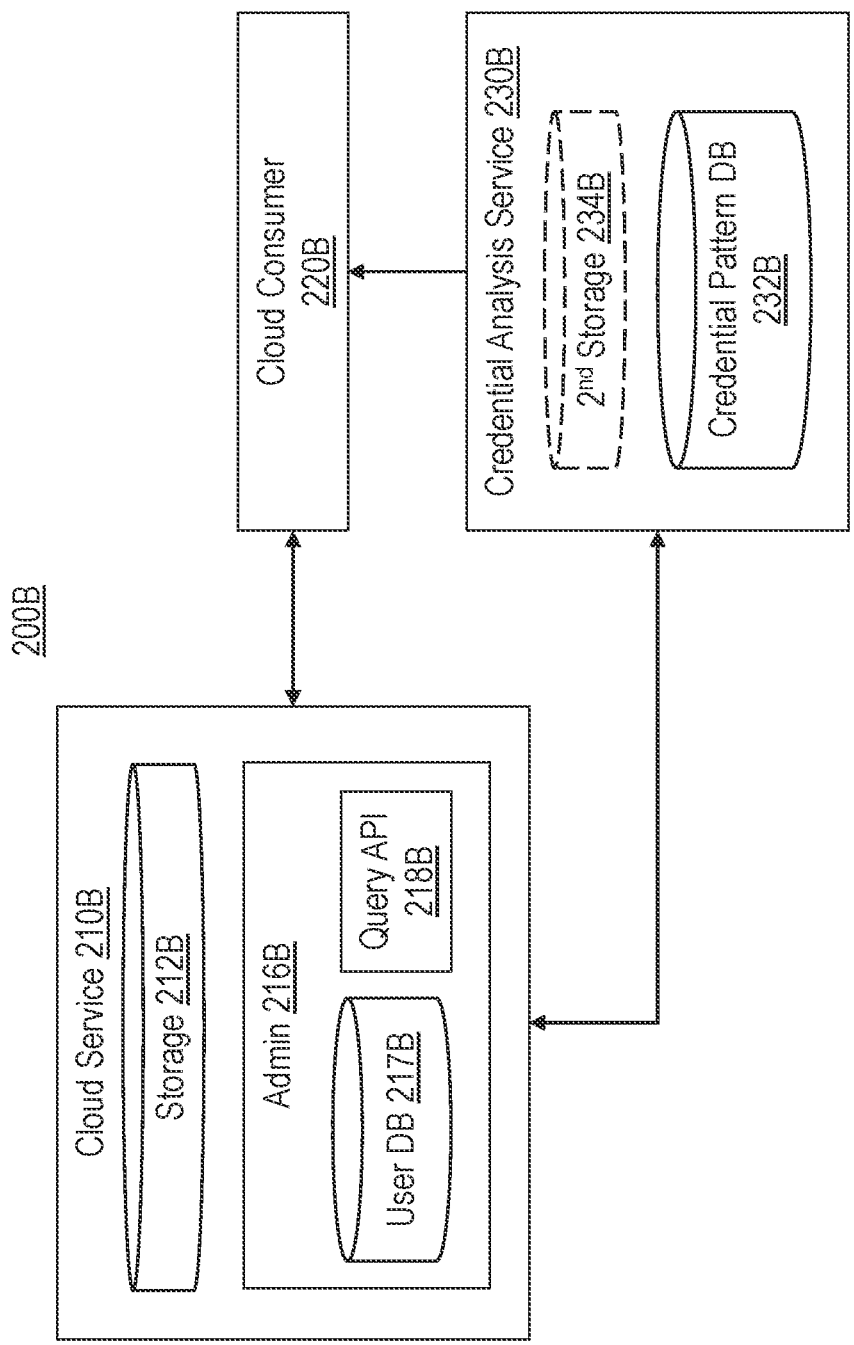
FIG. 2B illustrates another example process of finding credentials from a cloud storage.

FIG. 2B illustrates another example process 200B of finding credentials from a cloud storage. As illustrated in FIG. 2B, a cloud service 210B is accessible by a cloud service consumer 220B. Similar to the cloud service 210A in FIG. 2A, the cloud service 210B has a variety of resources, including a storage 212B. At the same time, a credential analysis service 230B may or may not have first-party access or has been granted a scope of permission to access the storage 212B of the cloud service 210B.

Further, the credential analysis service 230B is configured to make a copy of at least a portion of the storage 212B in a second storage 232B. Unlike the second storage 214A in FIG. 2A, here, the second storage 232B is associated with the credential analysis service 230B. In some embodiments, the storage 212B is a disk. The credential analysis service 230B determines a size of the disk, and provisions the second storage 234B having at least the size. A copy of the disk is then stored in the second storage 234B.

After a credential (also referred to as a first credential) is found, the credential analysis service 230B is then configured to extract an identifier associated with the credential and a scope of permission, to which the identifier is granted. Similar to the cloud service 210A, the cloud service 210B may have an administration module 216B configured to manage a user database 217B and a query API 218B is provided to allow query of user information. The credential analysis service 230B can query the user database 217B via the query API to obtain the scope of permission associated with the identifier.

In some cases, the cloud resource associated with the credential is also a cloud storage (also referred to as a second cloud storage), and this second cloud storage is also scanned, and additional credentials are found from the second cloud storage. The additional credentials are associated with additional cloud resources, which may also be cloud storages (also referred to as third cloud storages). This process can continue until a closed set of cloud storages are identified. This closed set of storages are also referred to as a blast radius of the first credential extracted from the first cloud storage.

Figure 3:
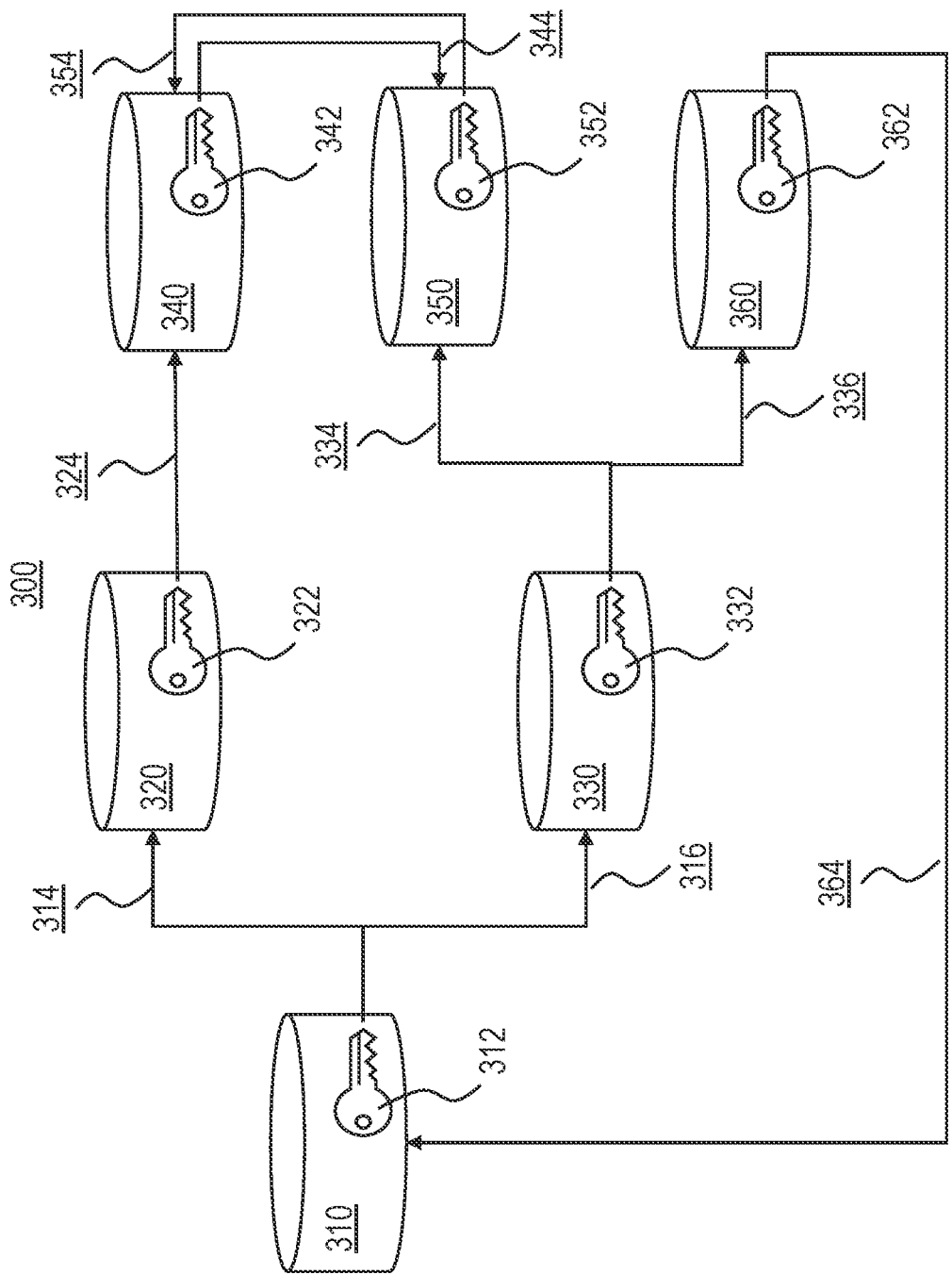
FIG. 3 illustrates a diagram of a blast radius of cloud storages based on a credential extracted from a cloud storage.

FIG. 3 illustrates a graph of an example blast radius 300 of a credential 312 found in cloud storage 310. As illustrated, cloud storage 310 is scanned to find a first credential 312. A scope of permission associated with the first credential 312 is identified. The scope of permission includes a permission to access second cloud storages 320 and 330 (represented by arrows 314, 316).

The second cloud storages 320 and 330 are also scanned to find credentials. As illustrated, second credential 322 is found from second cloud storage 320, and second credential 332 is found from second cloud storage 330. Again, a scope of permission associated with each of the second credentials 322 and 332 is identified. Here, the scope of permission associated with second credential 322 includes a third cloud storage 340 (represented by arrow 324), and the scope of permission associated with second credential 332 includes third cloud storages 350 and 360 (represented by arrows 334, 336).

Again, the third cloud storages 340, 350, and 360 are scanned to find credentials. As illustrated, third credential 342 is found from third cloud storage 340, third credential 352 is found from third cloud storage 350, and third credential 362 is found from the cloud storage 360. Again, a scope of permission associated with each of the third credentials 342, 352, 362 is identified. Here, the scope of permission associated with third credential 342 includes the third cloud storage 350 (represented by arrow 344), the scope of permission associated with third credential 352 includes the third cloud storage 340 (represented by arrow 354), and the scope of permission associated with third credential 362 includes the first cloud storage 310 (represented by arrow 364).

The cloud storages 310, 320, 330, 340, 350, and 360 form a closed set of cloud storages associated with the first credential 312 found from the first cloud storage 310. As such, the cloud storages 310, 320, 330, 340, 350, and 360 form a blast radius of the first credential 312.

In some embodiments, a plurality of cloud resources are scanned, and a plurality of credentials are extracted from the plurality of cloud resources. A network of relationships between the credentials and the plurality of cloud resources can then be obtained. For any given credential, a blast radius can be identified based on the obtained network of relationships.

In some embodiments, the blast radius and/or the network of relationships can be visualized and presented to owners of each or some of the owners of the cloud storages therewithin. The blast radius can also be used to measure the risk of potential exposure of the first credential. The greater the blast radius, the greater risk of potential exposure of the first credential might be, and more mitigating actions may be performed.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
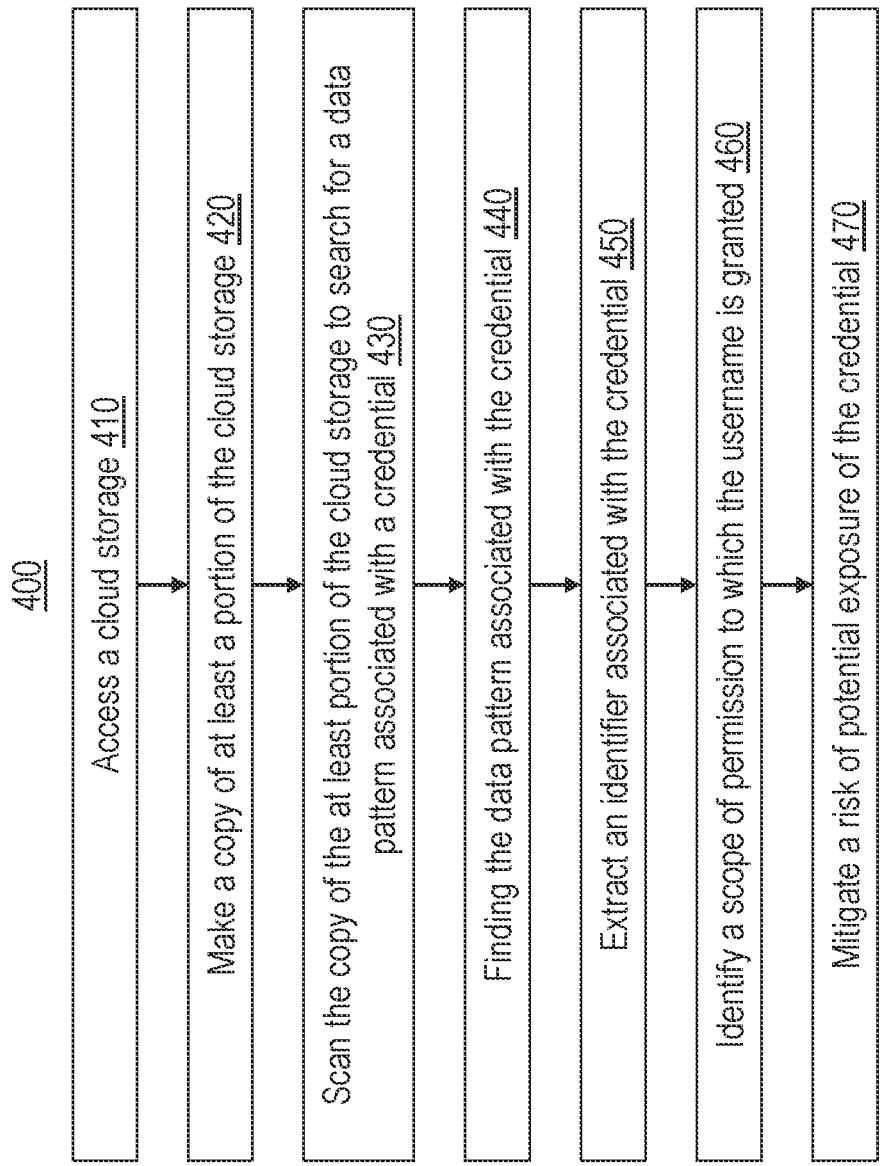
FIG. 4 illustrates a flowchart of an example method for finding a credential from a cloud storage.

FIG. 4 illustrates a flowchart of an example method 400 for finding a credential from a cloud storage. The method 400 includes accessing a cloud storage (also referred to as a first cloud storage) (act 410). In some embodiments, the method 400 also includes obtaining a permission to access the cloud storage. The method 400 further includes making a copy of at least a portion of the cloud storage (act 420 and scanning the copy of the at least portion of the cloud storage to search for a data pattern associated with a credential (also referred to as a first credential) (act 430).

In some embodiments, the data pattern is one of a plurality of predetermined data patterns. In some embodiments, the plurality of predetermined data patterns includes at least one of (1) a cloud service password of a principal, (2) a cloud service certificate of a principal, (3) a cloud service command-line interface (CLI) token, (4) a cloud service CLI credential, (5) a cloud application service publish setting file, (6) a Kubernetes kubeconfig file, (7) a cloud storage connection string, (8) a container registry credential, (9) a relational database service (RDS) secret, or (10) an OpenShift configuration file.

In response to finding the data pattern associated with the credential (act 440), an identifier associated with the credential is identified (act 450) and a scope of permission, to which the identifier is granted, is identified (act 460).

In some embodiments, in response to finding a cloud service password of a principal, the method 400 further includes identifying a resource that the principal has access to or a project that the principal has access to. In some embodiments, in response to finding a Kubernetes kubeconfig file, the method 400 further includes identifying a workload or a secret in a Kubernetes cluster. In some embodiments, in response to finding a cloud storage connection string, the method 400 further includes identifying a container, a blob, or a bucket that a credential associated with the cloud storage connection string has access to. In some embodiments, in response to finding a container registry, the method 400 further includes identifying a repository in the container registry and a scope of permission that a credential associated with the container registry has.

After the scope of permission is obtained, a risk of potential exposure of the credential is mitigated (act 470). Mitigating the risk of potential exposure of the credential includes (but is not limited to) at least one of (1) generating a security alert, notifying an owner of the cloud resource, (2) deleting the credential from the cloud storage, or (3) modifying or revoking the scope of permission associated with the credential. In some embodiments, which mitigating action is to be performed is based on an attribute or importance of the resource associated with the credential, and/or based on a setting that may be set by the owner of the credential, the owner of the resource, the cloud service, and/or the cloud service provider.

Figure 5:
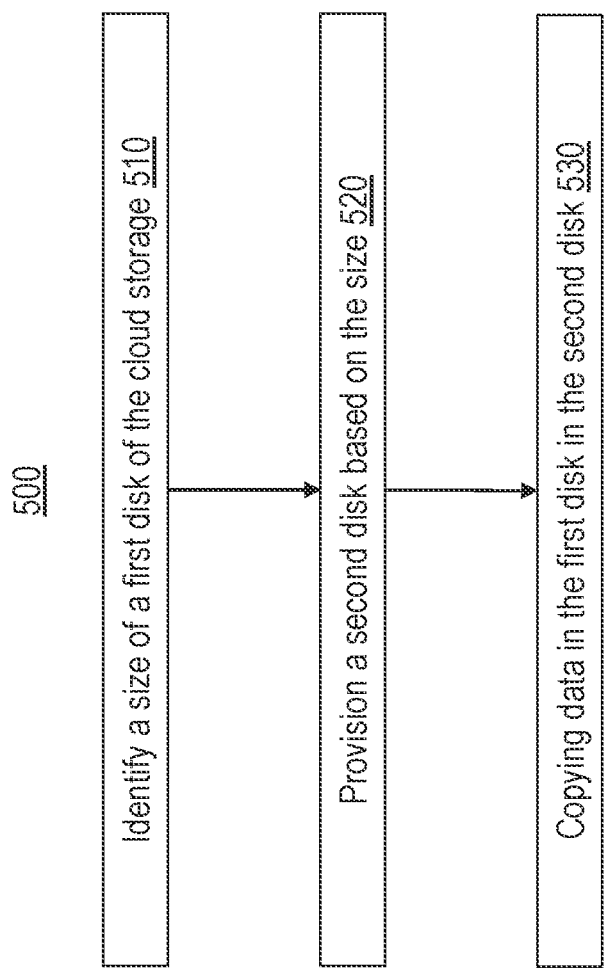
FIG. 5 illustrates a flowchart of an example method for making a copy of at least a portion of the cloud storage.

FIG. 5 illustrates a flowchart of an example method 500 for making a copy of at least a portion of the cloud storage, which corresponds to act 420 of FIG. 4. The method 500 includes identifying a size of a first disk of the cloud storage (act 510), provisioning a second disk based on the size of the first disk (act 520), and storing data in the first disk of the cloud storage in the second disk (act 530).

Figure 6:
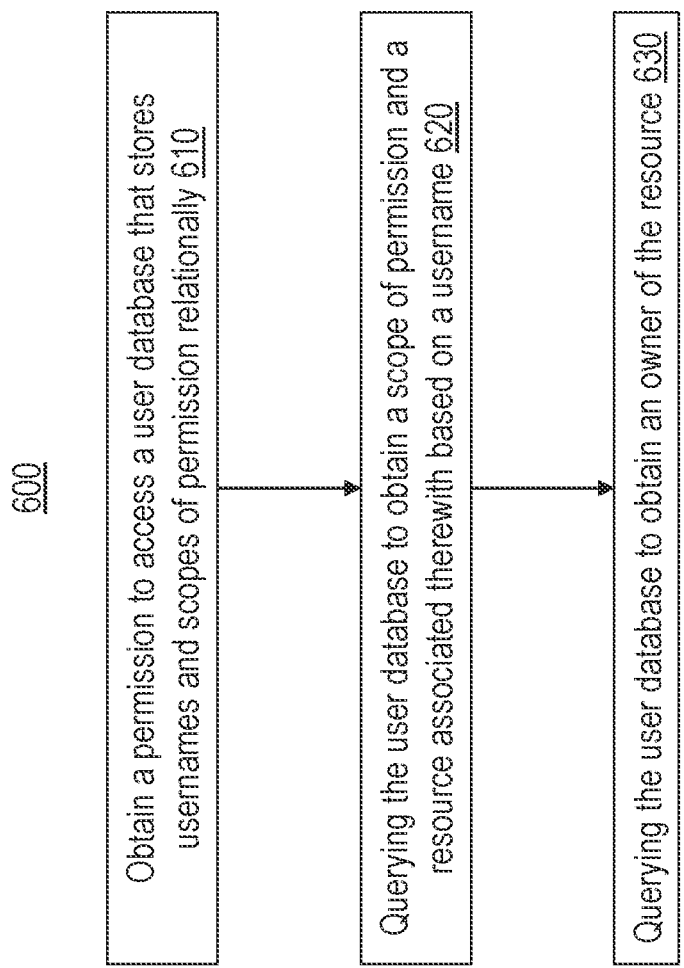
FIG. 6 illustrates a flowchart of an example method for identifying a scope of permission to which an identifier is granted.

FIG. 6 illustrates a flowchart of an example method 600 for identifying a scope of permission to which an identifier is granted, which corresponds to act 460 of FIG. 4. The method 600 includes obtaining a permission to access a user database that stores identifiers and scope of permission relationally (act 610), and querying the user database to obtain a scope of permission and a resource associated therewith based on the identifier (act 620). The method 600 also includes querying the user database to obtain an owner of the resource (act 630). Notably, the owner of the resource may or may not correspond to the identifier associated with the found credential.

In some cases, the resource is also a cloud storage (also referred to as a second storage). The second storage can also be scanned through the method 400 of FIG. 4 to identify additional credentials (also referred to as second credentials), and additional resources associated therewith. This process can repeat as many times as necessary to identify a closed set of cloud resources, which forms a blast radius of the first credential identified in the first cloud storage.

Finally, because the principles described herein may be performed in the context of a computing system (for example, each cloud service or a credential analysis service includes one or more computing systems) some introductory discussion of a computing system will be described with respect to FIG. 7.

Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
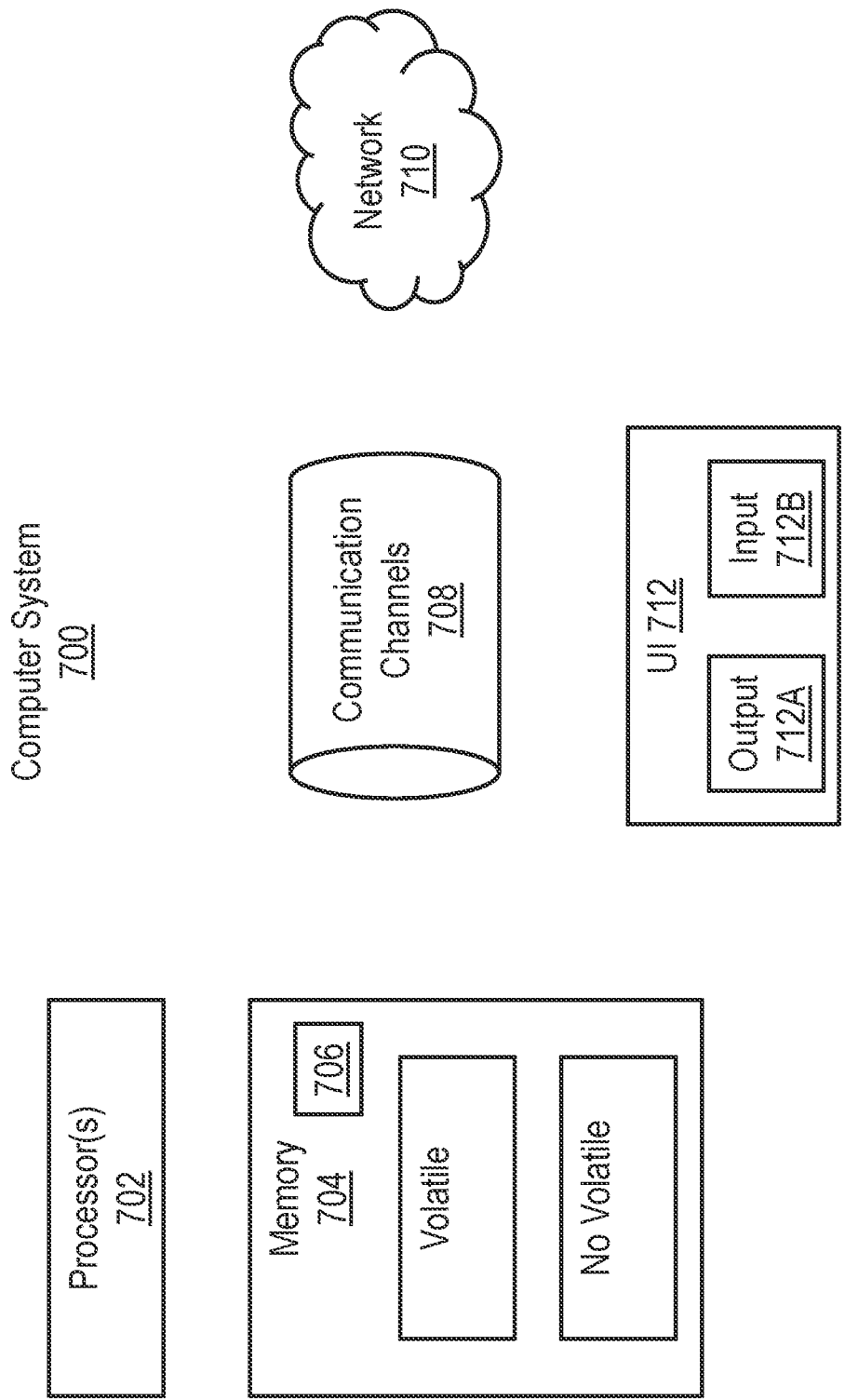
FIG. 7 illustrates an example computing system in which the principles described herein may be employed.

As illustrated in FIG. 7, in its most basic configuration, a computing system 700 typically includes at least one hardware processing unit 702 and memory 704. The processing unit 702 may include a general-purpose processor and may also include a field-programmable gate array (FPGA), an application-specific integrated circuit (ASIC), or any other specialized circuit. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 700 also has thereon multiple structures often referred to as an "executable component". For instance, memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, holograms, and so forth. Examples of input mechanisms 712B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmissions media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 700 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 702 and memory 704, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable hardware storage device having stored thereon computer-executable instructions that are structured such that, when the computer-executable instructions are executed by the one or more processors, the computing system is configured to:
- access a portion of a first cloud storage, including accessing a first cloud storage resource comprising a first disk;
- provision a second disk, a second size of the second disk being at least a first size of the first disk;
- copy contents of the first disk into the second disk;
- find a first credential within the second disk, including scanning the second disk to search for a plurality of predetermined data patterns associated with different credential types;
- in response to finding the first credential within the second disk based on finding one of the plurality of predetermined data patterns within the second disk, extract a first identifier associated with the first credential;
- identify a first scope of permission that the first identifier is granted to, the first scope of permission being associated with a permission to access a second cloud storage resource of a second cloud storage;
- find a second credential within the second cloud storage resource, including scanning a portion of the second cloud storage resource to search for the plurality of predetermined data patterns; and
- mitigate a risk of potential exposure of the first credential and the second credential, wherein mitigating the risk of potential exposure includes at least one of generating a security alert by notifying a first owner of the first cloud storage resource and notifying a second owner of the second cloud storage resource, deleting the first credential from the first cloud storage and deleting the second credential from the second cloud storage, modifying or revoking the first scope of permission associated with the first credential and modifying or revoking a second scope of permission associated with the second credential, or resetting a first password associated with the first credential and resetting a second password associated with the second credential.

2. The computing system of claim 1, wherein identifying the first scope of permission comprises:
- obtaining a permission to access a user database that stores identifiers and scopes of permission relationally;
- querying the user database to obtain the first scope of permission and the first cloud storage resource associated therewith based on the first identifier; and
- querying the user database to obtain an owner of the first cloud storage resource.

3. The computing system of claim 1, wherein the computing system is further configured to obtain a permission to access the first cloud storage.

4. The computing system of claim 1, wherein the plurality of predetermined data patterns includes at least one of (1) a cloud service password of a principal, (2) a cloud service certificate of a principal, (3) a cloud service command line interface (CLI) token, (4) a cloud service CLI credential, (5) a cloud application service publish setting file, (6) a Kubernetes kubeconfig file, (7) a cloud storage connection string, (8) a container registry credential, (9) a relational database service (RDS) secret, or (10) an OpenShift configuration file.

5. The computing system of claim 4, wherein in response to finding a cloud service password of a principal, the computing system is configured to identify a resource that the principal has access to or a project that the principal has access to.

6. The computing system of claim 4, wherein in response to finding a Kubernetes kubeconfig file, the computing system is configured to identify a workload or a secret in a Kubernetes cluster.

7. The computing system of claim 4, wherein in response to finding a cloud storage connection string, the computing system is configured to identify a container, a blob, or a bucket that a credential associated with the cloud storage connection string has access to.

8. The computing system of claim 4, wherein in response to finding a container registry, the computing system is configured to identify a repository in the container registry and a scope of permission that a credential associated with the container registry has.

9. A method implemented at a computing system for agentless finding credentials from a cloud storage, the method comprises:
- accessing a portion of a first cloud storage, including accessing a first cloud storage resource comprising a first disk;
- provisioning a second disk, a second size of the second disk being at least a first size of the first disk;
- copying at least a portion of the first disk into the second disk;
- finding a first credential within the second disk, including scanning the second disk to search for a plurality of predetermined data patterns that match different credential types;
- in response to finding the first credential within the second disk based on finding one of the plurality of predetermined data patterns within the second disk, identifying a first identifier associated with the first credential;
- identifying a first scope of permission that the first identifier is granted to, the first scope of permission being associated with a permission to access a second cloud storage resource of a second cloud storage;
- finding a second credential within the second cloud storage resource, including scanning a portion of the second cloud storage resource to search for the plurality of predetermined data patterns; and
- mitigating a risk of potential exposure of the first credential and the second credential, wherein mitigating the risk of potential exposure includes at least one of generating a security alert by notifying a first owner of the first cloud storage resource and notifying a second owner of the second cloud storage resource, deleting the first credential from the first cloud storage and deleting the second credential from the second cloud storage, modifying or revoking the first scope of permission associated with the first credential and modifying or revoking a second scope of permission associated with the second credential, or resetting a first password associated with the first credential and resetting a second password associated with the second credential.

10. The method of claim 9, wherein identifying the first scope of permission comprises:
- obtaining permission to access a user database that stores identifiers and scopes of permission relationally;
- querying the user database to obtain the first scope of permission and the first cloud storage resource associated therewith based on the first identifier; and
- querying the user database to obtain an owner of the first cloud storage resource.

11. The method of claim 9, wherein the method further comprises obtaining permission to access the first cloud storage.

12. The method of claim 9, wherein the plurality of predetermined data patterns includes at least one of (1) a cloud service password of a principal, (2) a cloud service certificate of a principal, (3) a cloud service command line interface (CLI) token, (4) a cloud service CLI credential, (5) a cloud application service publish setting file, (6) a Kubernetes kubeconfig file, (7) a cloud storage connection string, (8) a container registry credential, (9) a relational database service (RDS) secret, or (10) an OpenShift configuration file.

13. A computer program product comprising one or more hardware storage devices having stored thereon computer-executable instructions that are structured such that, when the computer-executable instructions are executed by one or more processors of a computing system, the computer-executable instructions configure the computing system to:

- access a portion of a first cloud storage, including accessing a first cloud storage resource comprising a first disk;
- provision a second disk, a second size of the second disk being at least a first size of the first disk;
- copying contents of the first disk into the second disk;
- find a first credential within the second disk, including scanning the second disk to search for a plurality of predetermined data patterns that are associated with different credential types;
- in response to finding the first credential, extract a first identifier associated with the first credential within the second disk based on finding one of the plurality of predetermined data patterns within the second disk;
- identify a first scope of permission that the first identifier is granted to, the first scope of permission being associated with a permission to access a second cloud storage resource of a second cloud storage;
- find a second credential within the second cloud storage resource, including scanning a portion of the second cloud storage resource to search for the plurality of predetermined data patterns; and
- mitigate a risk of potential exposure of the first credential and the second credential, wherein mitigating the risk of potential exposure includes at least one of generating a security alert by notifying a first owner of the first cloud storage resource and notifying a second owner of the second cloud storage resource, deleting the first credential from the first cloud storage and deleting the second credential from the second cloud storage, modifying or revoking the first scope of permission associated with the first credential and modifying or revoking a second scope of permission associated with the second credential, or resetting a first password associated with the first credential and resetting a second password associated with the second credential.

14. The computing system of claim 1, wherein at least one of the first disk or the second disk is a physical disk.

15. The computing system of claim 1, wherein at least one of the first disk or the second disk is a virtual disk.

16. The computing system of claim 1, wherein at least one of the plurality of predetermined data patterns is associated with a JavaScript Object Notation (JSON) format, a Yet Another Markup Language (YAML) format, or an extensible markup language (XML) format.

17. The computing system of claim 1, wherein:
- when the first credential is a cloud service password of a principal, and the computing system reports a cloud resource that the principal has permission to;
- when the first credential is a Kubernetes kubeconfig, and the computing system reports one or more of a workload or a secret in a Kubernetes cluster;
- when the first credential is a cloud storage connection string, and the computing system reports one or more of a container, a blob, or a bucket to which the first credential has access; or
- when the first credential is a container registry credential, and the computing system reports one or more of a repository in the container registry or a credential permission.

18. The method of claim 9, wherein at least one of the first disk or the second disk is a physical disk.

19. The method of claim 9, wherein at least one of the first disk or the second disk is a virtual disk.

20. The method of claim 12, The computing system of claim 1, wherein at least one of the plurality of predetermined data patterns is associated with a JavaScript Object Notation (JSON) format, a Yet Another Markup Language (YAML) format, or an extensible markup language (XML) format.

* * * * *